United States Patent
Aota et al.

(10) Patent No.: US 8,475,322 B2
(45) Date of Patent: Jul. 2, 2013

(54) AUTOMATIC TRANSMISSION

(75) Inventors: Kazuaki Aota, Sagamihara (JP);
Yukiyoshi Inuta, Isehara (JP); Akihiro Yamamoto, Hiratsuka (JP); Takayuki Okuda, Atsugi (JP); Joerg Mueller, Chemnitz (DE); Rico Resch, Chemnitz (DE); Mirko Leesch, Thum (DE)

(73) Assignee: Jatco Ltd, Fuji-shi (JP)

( * ) Notice: Subject to any disclaimer, the term of this patent is extended or adjusted under 35 U.S.C. 154(b) by 176 days.

(21) Appl. No.: 13/155,823

(22) Filed: Jun. 8, 2011

(65) Prior Publication Data
US 2011/0306461 A1    Dec. 15, 2011

(30) Foreign Application Priority Data
Jun. 15, 2010    (JP) .................................. 2010-136280

(51) Int. Cl.
*F16H 3/62*    (2006.01)
*F16H 3/44*    (2006.01)

(52) U.S. Cl.
USPC ............................. 475/275; 475/296; 475/319

(58) Field of Classification Search
USPC .......................... 475/275–292, 296, 330, 319
See application file for complete search history.

(56) References Cited

U.S. PATENT DOCUMENTS

| | | | | |
|---|---|---|---|---|
| 3,945,624 A | * | 3/1976 | Rossi | 475/290 |
| 5,226,862 A | * | 7/1993 | Hattori | 475/286 |
| 7,731,622 B2 | * | 6/2010 | Wittkopp et al. | 475/275 |
| 7,988,589 B2 | * | 8/2011 | Seo et al. | 475/284 |
| 2012/0004067 A1 | * | 1/2012 | Aota et al. | 475/275 |

FOREIGN PATENT DOCUMENTS

| | | |
|---|---|---|
| DE | 102 31 352 A1 | 2/2004 |
| JP | 2001-182785 A | 7/2001 |

\* cited by examiner

*Primary Examiner* — Roger Pang
(74) *Attorney, Agent, or Firm* — Foley & Lardner LLP

(57) ABSTRACT

An automatic transmission includes a double-pinion planetary gearset and two single-pinion planetary gearsets. A first ring gear is held stationary. A second sun gear and a third ring gear are coupled to a first sun gear and a first carrier respectively, constituting first and second rotor units. An output is coupled to a third carrier. A first clutch selectively couples a second carrier to the first rotor unit. A second clutch selectively couples the second carrier to the second rotor unit. A third clutch selectively couples an input to the second carrier. A fourth clutch selectively couples a second ring gear to a third sun gear. A fifth clutch selectively couples the second ring gear to the third carrier. A sixth clutch selectively couples the input to the third sun gear. Nine forward gear ratios and one reverse gear ratio are obtained by simultaneous application of three of the clutches.

3 Claims, 7 Drawing Sheets

$\rho 1 = -0.493$
$\rho 2 = 0.327$  RC=10.31
$\rho 3 = 0.617$  REV/1ST=1.089

| GEAR | C1 | C2 | C3 | C4 | C5 | C6 | GEAR RATIO | RATIO BETWEEN GEAR RATIOS |
|---|---|---|---|---|---|---|---|---|
| FIRST | ○ | | | | ○ | ○ | 4.196 | 1.600 |
| SECOND | ○ | ○ | | | | ○ | 2.622 | 1.592 |
| THIRD | | ○ | | | ○ | ○ | 1.647 | 1.241 |
| FOURTH | | ○ | | ○ | | ○ | 1.328 | 1.328 |
| FIFTH | | ○ | ○ | | | ○ | 1.000 | 1.253 |
| SIXTH | | ○ | ○ | ○ | | | 0.798 | 1.328 |
| SEVENTH | | ○ | ○ | | ○ | | 0.601 | 1.203 |
| EIGHTH | | | ○ | ○ | ○ | | 0.500 | 1.228 |
| NINTH | | | ○ | | ○ | ○ | 0.407 | |
| REVERSE | ○ | | ○ | | | ○ | -4.569 | |

FIG.3

THE NUMBER OF GEAR MESHES IN TORQUE FLOW

| | 1ST | 2ND | 3RD | 4TH | 5TH | 6TH | 7TH | 8TH | 9TH | AVERAGE |
|---|---|---|---|---|---|---|---|---|---|---|
| FIRST PLANETARY GEARSET (DOUBLE PINION TYPE) | 3 | 0 | 3 | 3 | 0 | 3 | 3 | 3 | 3 | |
| SECOND PLANETARY GEARSET (SINGLE PINION TYPE) | 0 | 0 | 2 | 2 | 0 | 2 | 2 | 2 | 2 | |
| THIRD PLANETARY GEARSET (SINGLE PINION TYPE) | 2 | 2 | 2 | 2 | 0 | 2 | 0 | 0 | 2 | |
| TOTAL | 5 | 2 | 7 | 7 | 0 | 7 | 5 | 5 | 7 | 5.00 |

FIG.4

| C1 | 2.743 |
|----|-------|
| C2 | 1.293 |
| C3 | 2.743 |
| C4 | 0.494 |
| C5 | 1.574 |
| C6 | 1.743 |

REV

| | | | | | | | $\rho 1 = -0.375$ | $RC = 6.397$ |
| --- | --- | --- | --- | --- | --- | --- | --- | --- |
| | | | | | | | $\rho 2 = 0.500$ | REV1/1ST = 0.750 |
| | | | | | | | $\rho 3 = -0.375$ | REV2/1ST = 0.469 |

| GEAR | CX1 | CX2 | CX3 | CX4 | BX1 | BX2 | GEAR RATIO | RATIO BETWEEN GEAR RATIOS |
| --- | --- | --- | --- | --- | --- | --- | --- | --- |
| FIRST | ○ | | | | | ○ | 4.267 | 1.714 |
| SECOND | ○ | | | | ○ | | 2.489 | 1.556 |
| THIRD | ○ | ○ | | | | | 1.600 | 1.214 |
| FOURTH | ○ | | | ○ | | | 1.318 | 1.132 |
| FIFTH | ○ | | ○ | | | | 1.164 | 1.164 |
| SIXTH | | | ○ | ○ | | | 1.000 | 1.188 |
| SEVENTH | | ○ | ○ | | | | 0.842 | 1.262 |
| EIGHTH | | | ○ | | ○ | | 0.667 | |
| FIRST REVERSE | | ○ | | | | ○ | -3.200 | |
| SECOND REVERSE | | | | ○ | | ○ | -2.000 | |

FIG.17
PRIOR ART

THE NUMBER OF GEAR MESHES IN TORQUE FLOW

| | 1ST | 2ND | 3RD | 4TH | 5TH | 6TH | 7TH | 8TH | AVERAGE |
| --- | --- | --- | --- | --- | --- | --- | --- | --- | --- |
| FIRST PLANETARY GEARSET (DOUBLE PINION TYPE) | 3 | 3 | 3 | 3 | 3 | 0 | 3 | 0 | |
| SECOND PLANETARY GEARSET (SINGLE PINION TYPE) | 0 | 2 | 0 | 2 | 0 | 0 | 2 | 2 | |
| THIRD PLANETARY GEARSET (DOUBLE PINION TYPE) | 3 | 3 | 0 | 3 | 3 | 0 | 0 | 0 | |
| TOTAL | 6 | 8 | 3 | 8 | 6 | 0 | 5 | 2 | 4.75 |

FIG.18
PRIOR ART

| CX1 | 1.600 |
| --- | --- |
| CX2 | 1.600 |
| CX3 | 1.500 |
| CX4 | 0.500 |
| BX1 | 0.889 |
| BX2 | 4.800 |

AUTOMATIC TRANSMISSION

BACKGROUND OF THE INVENTION

The present invention relates to gear-type stepwise-variable automatic transmissions for motor vehicles.

Japanese Patent Application Publication No. 2001-182785 discloses an eight-speed automatic transmission which is composed of one double-pinion planetary gearset, one Ravigneaux planetary gearset, and six coupling members (i.e. four clutches and two brakes) for establishing eight forward gear ratios and two reverse gear ratios.

SUMMARY OF THE INVENTION

The automatic transmission according to Japanese Patent Application Publication No. 2001-182785 can be regarded as having two double-pinion planetary gearsets and one single-pinion planetary gearset, because the Ravigneaux planetary gearset can be regarded as having one double-pinion planetary gearset and one single-pinion planetary gearset. In this automatic transmission, each gear ratio is obtained by simultaneous application of two of the six coupling members. Accordingly, in this automatic transmission, four of the coupling members are released constantly, in each of which a pair of engaging elements are rotating relative to each other. Relative rotation between the engaging elements in each released coupling member can cause a friction loss, and thereby adversely affect the power transfer efficiency. In cases where a multiple-plate clutch or brake is used as a coupling member in an automatic transmission as commonly used, oil injected for cooling and/or lubrication is present between each driving plate and an adjacent driven plate in the coupling member, when the coupling member is released so that the driving plate is rotating relative to the driven plate. This oil can cause a friction loss due to dragging between the driving plate and the driven plate. This friction loss tends to increase, as the number of plates of the coupling member increases, and as the relative rotational speed between the plates increases.

In view of the foregoing, it is desirable to provide an automatic transmission which is composed of three planetary gearsets and six coupling members and capable of providing at least eight forward gear ratios with a reduced friction loss at each gear ratio, and also with an improved power transfer efficiency.

According to one aspect of the present invention, an automatic transmission comprises: a double-pinion planetary gearset including: a first sun gear; a first ring gear constantly held stationary; and a first planet-pinion carrier arranged to carry a first planet pinion set in mesh with the first sun gear and the first ring gear; a first single-pinion planetary gearset including: a second sun gear, wherein the second sun gear is constantly coupled to the first sun gear so as to constitute a first rotor unit; a second ring gear; and a second planet-pinion carrier arranged to carry a second planet pinion set in mesh with the second sun gear and the second ring gear; a second single-pinion planetary gearset including: a third sun gear; a third ring gear, wherein the third ring gear is constantly coupled to the first planet-pinion carrier so as to constitute a second rotor unit; and a third planet-pinion carrier arranged to carry a third planet pinion set in mesh with the third sun gear and the third ring gear; an input shaft; an output shaft constantly coupled to the third planet-pinion carrier; a first coupling member arranged to be selectively applied to couple the second planet-pinion carrier to the first rotor unit; a second coupling member arranged to be selectively applied to couple the second planet-pinion carrier to the second rotor unit; a third coupling member arranged to be selectively applied to couple the input shaft to the second planet-pinion carrier; a fourth coupling member arranged to be selectively applied to couple the second ring gear to the third sun gear; a fifth coupling member arranged to be selectively applied to couple the second ring gear to the third planet-pinion carrier; and a sixth coupling member arranged to be selectively applied to couple the input shaft to the third sun gear; wherein at least first to eighth forward gear ratios and one reverse gear ratio are obtained between the input shaft and the output shaft by simultaneous application of three of the first to sixth coupling members.

DETAILED DESCRIPTION OF THE INVENTION

Figure 1:
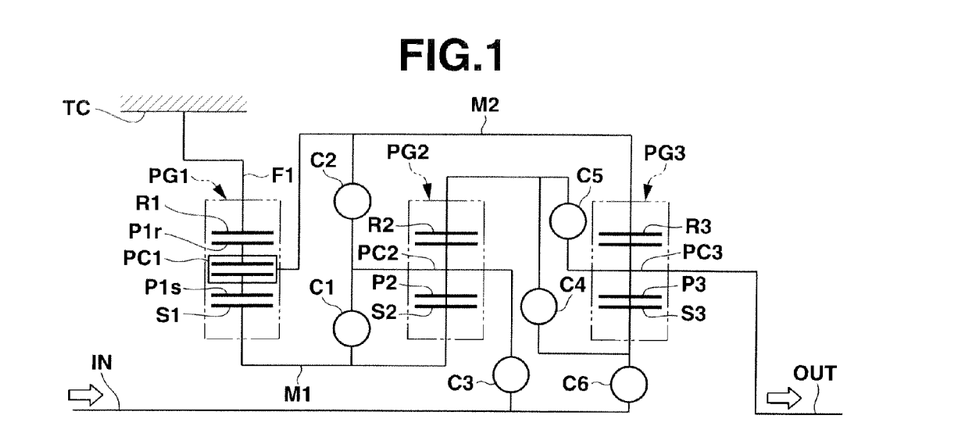
FIG. 1 is a skeleton diagram showing an automatic transmission according to an embodiment of the present invention.

FIG. 1 shows an automatic transmission according to an embodiment of the present invention. As shown in FIG. 1, the automatic transmission includes a first planetary gearset PG1, a second planetary gearset PG2, a third planetary gearset PG3, an input shaft "IN", an output shaft "OUT", a first rotor M1, a second rotor M2, a first stator F1, a first clutch C1 as a first coupling member or friction member, a second clutch C2 as a second coupling member or friction member, a third clutch C3 as a third coupling member or friction member, a fourth clutch C4 as a fourth coupling member or friction member, a fifth clutch C5 as a fifth coupling member or friction member, a sixth clutch C6 as a sixth coupling member or friction member, and a transmission case "TC".

First planetary gearset PG1 is of a double pinion type, including a first sun gear S1, a first ring gear R1, and a first planet-pinion carrier PC1 that is arranged to carry a first planet pinion set. The first planet pinion set includes double planet pinion sets, i.e. a planet pinion set P1s and a planet pinion set P1r. Planet pinion set P1s is in simultaneous mesh with first sun gear S1 and planet pinion set P1r. Planet pinion set P1r is in simultaneous mesh with first ring gear R1 and planet pinion set P1s. Second planetary gearset PG2 is of a single pinion type, including a second sun gear S2, a second ring gear R2, and a second planet-pinion carrier PC2 that is arranged to carry a second planet pinion set P2 in simultaneous mesh with second sun gear S2 and second ring gear R2. Third planetary gearset PG3 is of a single pinion type, including a third sun gear S3, a third ring gear R3, and a third planet-pinion carrier PC3 that is arranged to carry a third planet pinion set P3 in simultaneous mesh with third sun gear S3 and third ring gear R3.

Input shaft IN is adapted to be connected to a driving source such as an internal combustion engine, so that a driving torque is inputted through a torque converter, etc. to input shaft IN. On the other hand, output shaft OUT is adapted to be connected to driving wheels, so that a shifted driving torque is outputted through a propeller shaft, a final gear, etc. to the driving wheels. Output shaft OUT is fixed or constantly coupled to third planet-pinion carrier PC3.

First rotor M1 fixes or constantly couples first sun gear S1 to second sun gear S2 with no coupling member therebetween, where first rotor M1, first sun gear S1, and second sun gear S2 constitute a first rotor unit. Second rotor M2 fixes or constantly couples first planet-pinion carrier PC1 to third ring gear R3 with no coupling member therebetween, where second rotor M2, first planet-pinion carrier PC1, and third ring gear R3 constitute a second rotor unit.

First clutch C1 is arranged to be selectively applied to couple second planet-pinion carrier PC2 to first rotor M1, namely, hold second planet-pinion carrier PC2 with respect to first rotor M1. Second clutch C2 is arranged to be selectively applied to couple second planet-pinion carrier PC2 to second rotor M2, namely, hold second planet-pinion carrier PC2 with respect to second rotor M2. Third clutch C3 is arranged to be selectively applied to couple second planet-pinion carrier PC2 to input shaft IN, namely, hold second planet-pinion carrier PC2 with respect to input shaft IN. Fourth clutch C4 is arranged to be selectively applied to couple second ring gear R2 to third sun gear S3, namely, hold second ring gear R2 with respect to third sun gear S3. Fifth clutch C5 is arranged to be selectively applied to couple second ring gear R2 to third planet-pinion carrier PC3, namely, hold second ring gear R2 with respect to third planet-pinion carrier PC3. Sixth clutch C6 is arranged to be selectively applied to couple third sun gear S3 to input shaft IN, namely, hold third sun gear S3 with respect to input shaft IN.

First planetary gearset PG1, second planetary gearset PG2, and third planetary gearset PG3 are arranged in this order from an input side to an output side in an axial direction of the automatic transmission, wherein input shaft IN is arranged at the input side, and output shaft OUT is arranged at the output side.

Figure 2:
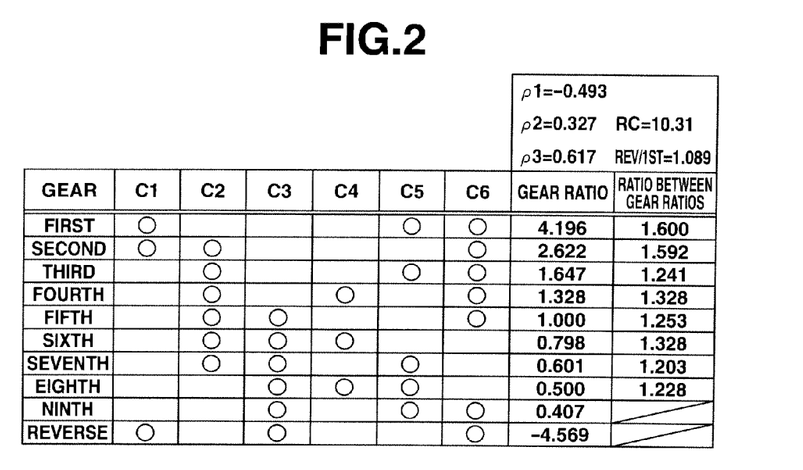
FIG. 2 is a table showing which three of six coupling members are selectively applied to obtain respective ones of first to ninth forward gear ratios and one reverse gear ratio in the automatic transmission according to the present embodiment.
Figure 3:
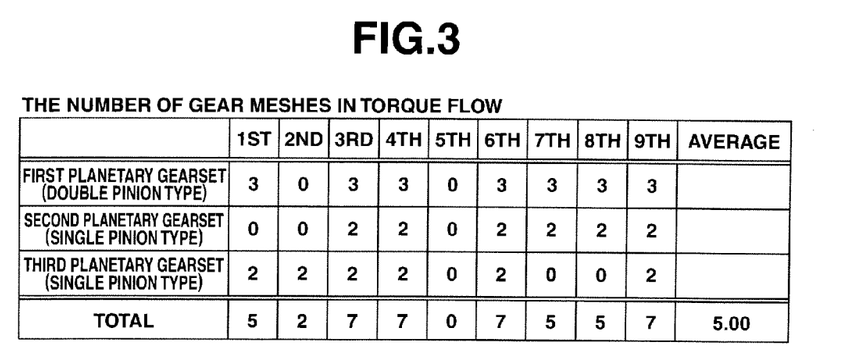
FIG. 3 is a table showing the number of gear meshes in torque flow in each forward gear ratio in the automatic transmission according to the present embodiment.

FIG. 2 shows which three of the six coupling members are selectively applied to obtain respective ones of first to ninth gear ratios and one reverse gear ratio in the automatic transmission according to the present embodiment. FIG. 3 shows the number of gear meshes in torque flow in each forward gear ratio in the automatic transmission according to the present embodiment. The number of gear meshes in torque flow is defined as the number of places in torque flow where torque is transmitted between gears turning in mesh with each other.

The first gear ratio is obtained by simultaneous application of first clutch C1, fifth clutch C5 and sixth clutch C6, as shown in FIG. 2. As shown in FIG. 3, in the first gear ratio, the number of gear meshes in torque flow is five, because first planetary gearset PG1 and third planetary gearset PG3 work for power transfer, and first planetary gearset PG1 has three places in torque flow where torque is transmitted between gears turning in mesh with each other, and third planetary gearset PG3 has two places in torque flow where torque is transmitted between gears turning in mesh with each other.

The second gear ratio is obtained by simultaneous application of first clutch C1, second clutch C2 and sixth clutch C6, as shown in FIG. 2. As shown in FIG. 3, in the second gear ratio, the number of gear meshes in torque flow is two, because only third planetary gearset PG3 works for power transfer, and has two places in torque flow where torque is transmitted between gears turning in mesh with each other.

The third gear ratio is obtained by simultaneous application of second clutch C2, fifth clutch C5 and sixth clutch C6, as shown in FIG. 2. As shown in FIG. 3, in the third gear ratio, the number of gear meshes in torque flow is seven, because all of first planetary gearset PG1, second planetary gearset PG2, and third planetary gearset PG3 work for power transfer, and first planetary gearset PG1 has three places in torque flow where torque is transmitted between gears turning in mesh with each other, and each of second planetary gearset PG2 and third planetary gearset PG3 has two places in torque flow where torque is transmitted between gears turning in mesh with each other.

The fourth gear ratio is obtained by simultaneous application of second clutch C2, fourth clutch C4 and sixth clutch C6, as shown in FIG. 2. As shown in FIG. 3, in the fourth gear ratio, the number of gear meshes in torque flow is seven, because all of first planetary gearset PG1, second planetary gearset PG2, and third planetary gearset PG3 work for power transfer, and first planetary gearset PG1 has three places in torque flow where torque is transmitted between gears turning in mesh with each other, and each of second planetary gearset PG2 and third planetary gearset PG3 has two places in torque flow where torque is transmitted between gears turning in mesh with each other.

The fifth gear ratio is obtained by simultaneous application of second clutch C2, third clutch C3 and sixth clutch C6, as shown in FIG. 2. As shown in FIG. 3, in the fifth gear ratio, the number of gear meshes in torque flow is zero, because none of first planetary gearset PG1, second planetary gearset PG2, and third planetary gearset PG3 works for power transfer.

The sixth gear ratio is obtained by simultaneous application of second clutch C2, third clutch C3 and fourth clutch C4, as shown in FIG. 2. As shown in FIG. 3, in the sixth gear ratio, the number of gear meshes in torque flow is seven, because all of first planetary gearset PG1, second planetary gearset PG2, and third planetary gearset PG3 work for power transfer, and first planetary gearset PG1 has three places in torque flow where torque is transmitted between gears turning in mesh with each other, and each of second planetary gearset PG2 and third planetary gearset PG3 has two places in torque flow where torque is transmitted between gears turning in mesh with each other.

The seventh gear ratio is obtained by simultaneous application of second clutch C2, third clutch C3 and fifth clutch C5, as shown in FIG. 2. As shown in FIG. 3, in the seventh gear ratio, the number of gear meshes in torque flow is five, because first planetary gearset PG1 and second planetary gearset PG2 work for power transfer, and first planetary gearset PG1 has three places in torque flow where torque is transmitted between gears turning in mesh with each other, and second planetary gearset PG2 has two places in torque flow where torque is transmitted between gears turning in mesh with each other.

The eighth gear ratio is obtained by simultaneous application of third clutch C3, fourth clutch C4 and fifth dutch C5, as shown in FIG. 2. As shown in FIG. 3, in the eighth gear ratio, the number of gear meshes in torque flow is five, because first planetary gearset PG1 and second planetary gearset PG2 work for power transfer, and first planetary gearset PG1 has three places in torque flow where torque is transmitted between gears turning in mesh with each other, and second planetary gearset PG2 has two places in torque flow where torque is transmitted between gears turning in mesh with each other.

The ninth gear ratio is obtained by simultaneous application of third clutch C3, fifth clutch C5 and sixth clutch C6, as shown in FIG. 2. As shown in FIG. 3, in the ninth gear ratio, the number of gear meshes in torque flow is seven, because all of first planetary gearset PG1, second planetary gearset PG2, and third planetary gearset PG3 work for power transfer, and first planetary gearset PG1 has three places in torque flow where torque is transmitted between gears turning in mesh with each other, and each of second planetary gearset PG2 and third planetary gearset PG3 has two places in torque flow where torque is transmitted between gears turning in mesh with each other.

The reverse gear ratio is obtained by simultaneous application of first clutch C1, third clutch C3 and sixth clutch C6, as shown in FIG. 2.

Figure 4:
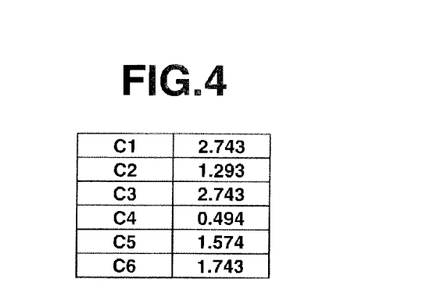
FIG. 4 is a table showing a maximum applied torque ratio of each coupling member in the automatic transmission according to the present embodiment.

FIG. 4 shows a maximum applied torque ratio of each coupling member in the automatic transmission according to the present embodiment. The applied torque ratio of a coupling member is defined as a ratio of a torque applied to the coupling member with respect to an input torque applied to input shaft IN. The applied torque ratio is determined by the construction of the automatic transmission and combination of applied coupling members, and is constant for each gear ratio even while the input torque is changing. The maximum applied torque ratio of a coupling member is defined as a maximum value of the applied torque ratio of the coupling member among values for the first to ninth gear ratios and the reverse gear ratio. As the maximum applied torque ratio of a coupling member increases, the torque applied to the coupling member increases with respect to the input torque, so that the number of friction plates of the coupling member is increased and thereby the size of the coupling member is increased in designing.

First clutch C1 is applied for obtaining one of the first, second and reverse gear ratios. The applied torque ratio of first clutch C1 is the largest in the reverse gear ratio among the first, second and reverse gear ratios, wherein the maximum applied torque ratio of first clutch C1 is equal to 2.743, as shown in FIG. 4.

Second clutch C2 is applied for obtaining one of the second, third, fourth, fifth, sixth and seventh gear ratios. The applied torque ratio of second clutch C2 is the largest in the third gear ratio among the second, third, fourth, fifth, sixth and seventh gear ratios, wherein the maximum applied torque ratio of second clutch C2 is equal to 1.293, as shown in FIG. 4.

Third clutch C3 is applied for obtaining one of the fifth, sixth, seventh, eighth, ninth and reverse gear ratios. The applied torque ratio of third clutch C3 is the largest in the reverse gear ratio among the fifth, sixth, seventh, eighth, ninth and reverse gear ratios, wherein the maximum applied torque ratio of third clutch C3 is equal to 2.743, as shown in FIG. 4.

Fourth clutch C4 is applied for obtaining one of the fourth, sixth and eighth gear ratios. The applied torque ratio of fourth clutch C4 is the largest in the fourth gear ratio among the fourth, sixth and eighth gear ratios, wherein the maximum applied torque ratio of fourth clutch C4 is equal to 0.494, as shown in FIG. 4.

Fifth clutch C5 is applied for obtaining one of the first, third, seventh, eighth and ninth gear ratios. The applied torque ratio of fifth clutch C5 is the largest in the first gear ratio among the first, third, seventh, eighth and ninth gear ratios, wherein the maximum applied torque ratio of fifth clutch C5 is equal to 1.574, as shown in FIG. 4.

Sixth clutch C6 is applied for obtaining one of the first, second, third, fourth, fifth, ninth and reverse gear ratios. The applied torque ratio of sixth clutch C6 is the largest in the reverse gear ratio among the first, second, third, fourth, fifth, ninth and reverse gear ratios, wherein the maximum applied torque ratio of sixth clutch C6 is equal to 1.743, as shown in FIG. 4.

FIGS. 5 to 14 show how the nine forward gear ratios and one reverse gear ratio are obtained in the automatic transmission according to the present embodiment.

Figure 5:
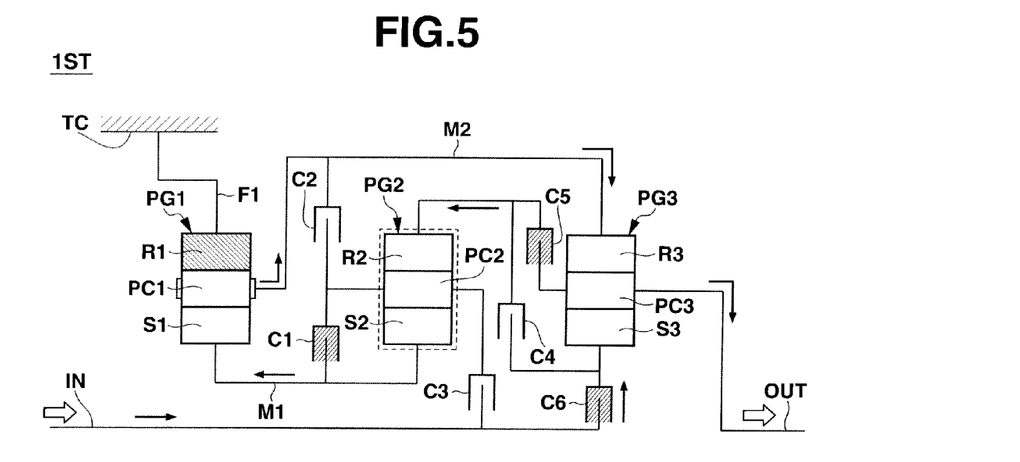
FIG. 5 is a diagram showing how the first gear ratio is obtained in the automatic transmission according to the present embodiment.

<First Gear Ratio> In the first gear ratio, first clutch C1, fifth clutch C5 and sixth clutch C6 are simultaneously applied, as shown by hatching pattern in FIG. 5. With sixth clutch C6 applied, third sun gear S3 and input shaft IN are coupled to and held stationary with respect to each other so that third sun gear S3 and input shaft IN rotate as a solid unit. With first clutch C1 and fifth clutch C5 applied simultaneously, second sun gear S2 and second planet-pinion carrier PC2 are locked together so that second sun gear S2, second planet-pinion carrier PC2 and second ring gear R2 of second planetary gearset PG2 rotate as a solid unit, and first sun gear S1, all of the members of second planetary gearset PG2, and third planet-pinion carrier PC3 are coupled to and held stationary with respect to each other so that these members rotate as a solid unit. When third sun gear S3 is driven in the normal direction with input shaft IN, the rotation of third sun gear S3 causes third planet-pinion carrier PC3 and third ring gear R3 to rotate under a constraint about rotation of first sun gear S1 and first planet-pinion carrier PC1 of first planetary gearset PG1 where first ring gear R1 is held stationary with respect to transmission case TC, namely, under a condition that the rotational speed of third planet-pinion carrier PC3 is conformed to the rotational speed of first sun gear S1 through first clutch C1, fifth clutch C5, first rotor M1 and second planetary gearset PG2, and the rotational speed of third ring gear R3 is conformed to the rotational speed of first planet-pinion carrier PC1 through second rotor M2. Under this condition, third planet-pinion carrier PC3 rotates in the normal direction at a reduced speed (reduced from the input speed) in third planetary gearset PG3. Finally, the rotation of third planet-pinion carrier PC3 drives output shaft OUT in the normal direction with a speed reduction of the first gear ratio with respect to the rotational speed of input shaft IN.

Figure 6:
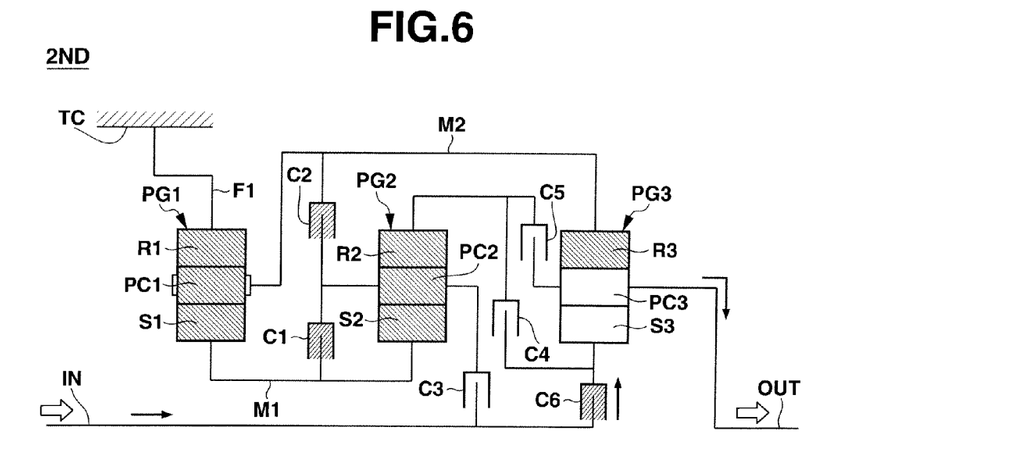
FIG. 6 is a diagram showing how the second gear ratio is obtained in the automatic transmission according to the present embodiment.

<Second Gear Ratio> In the second gear ratio, first clutch C1, second clutch C2 and sixth clutch C6 are simultaneously applied, as shown by hatching pattern in FIG. 6. With sixth clutch C6 applied, third sun gear S3 and input shaft IN are coupled to and held stationary with respect to each other so that third sun gear S3 and input shaft IN rotate as a solid unit. With first clutch C1 and second clutch C2 applied simultaneously, first sun gear S1, first planet-pinion carrier PC1 and first ring gear R1 of first planetary gearset PG1, and second sun gear S2, second planet-pinion carrier PC2 and second ring gear R2 of second planetary gearset PG2 are held stationary as a solid unit with respect to transmission case TC, and third ring gear R3 is held stationary with respect to transmission case TC. When third sun gear S3 is driven in the normal direction with input shaft IN, the rotation of third sun gear S3 causes third planet-pinion carrier PC3 to rotate in the normal direction at a reduced speed in third planetary gearset PG3 where third ring gear R3 is held stationary. Finally, the rotation of third planet-pinion carrier PC3 drives output shaft OUT in the normal direction with a speed reduction of the second gear ratio with respect to the rotational speed of input shaft IN, where the rotation of output shaft OUT is faster than in the first gear ratio.

Figure 7:
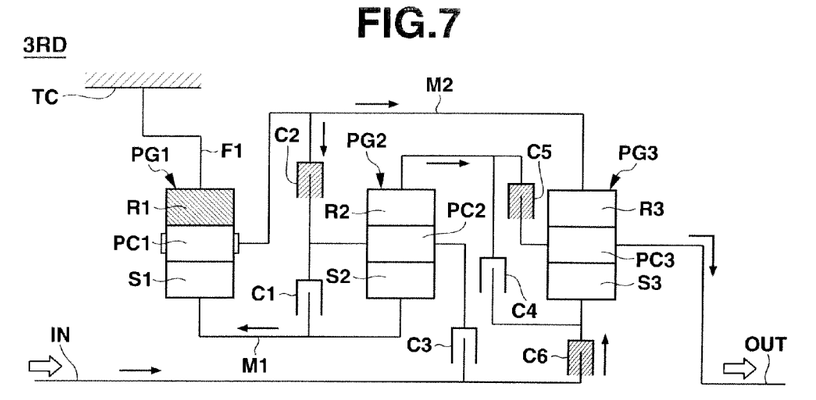
FIG. 7 is a diagram showing how the third gear ratio is obtained in the automatic transmission according to the present embodiment.

<Third Gear Ratio> In the third gear ratio, second clutch C2, fifth clutch C5 and sixth clutch C6 are simultaneously applied, as shown by hatching pattern in FIG. 7. With sixth clutch C6 applied, third sun gear S3 and input shaft IN are coupled to and held stationary with respect to each other so that third sun gear S3 and input shaft IN rotate as a solid unit. With second clutch C2 applied, first planet-pinion carrier PC1, second planet-pinion carrier PC2 and third ring gear R3 are coupled to and held stationary with respect to each other so that first planet-pinion carrier PC1, second planet-pinion carrier PC2 rotate as a solid unit. With fifth clutch C5 applied, second ring gear R2 and third planet-pinion carrier PC3 are coupled to and held stationary with respect to each other so that second ring gear R2 and third planet-pinion carrier PC3 rotate as a solid unit. When third sun gear S3 is driven in the normal direction with input shaft IN, the rotation of third sun gear S3 causes third planet-pinion carrier PC3 and third ring gear R3 to rotate under a constraint about rotation of second planet-pinion carrier PC2 and second ring gear R2 of second planetary gearset PG2, wherein second sun gear S2 and second planet-pinion carrier PC2 of second planetary gearset PG2 rotate under a constraint about rotation of first sun gear S1 and first planet-pinion carrier PC1 of first planetary gearset PG1 where first ring gear R1 is held stationary with respect to transmission case TC, namely, under a condition that the rotational speed of first sun gear S1 is conformed to the rotational speed of second sun gear S2 through first rotor M1, and the rotational speeds of first planet-pinion carrier PC1, second planet-pinion carrier PC2 and third ring gear R3 are conformed to each other through second clutch C2 and second rotor M2, and the rotational speed of second ring gear R2 is conformed to the rotational speed of third planet-pinion carrier PC3 through fifth clutch C5. Under this condition, third planet-pinion carrier PC3 rotates in the normal direction at a reduced speed (reduced from the input speed) in third planetary gearset PG3. Finally, the rotation of third planet-pinion carrier PC3 drives output shaft OUT in the normal direction with a speed reduction of the third gear ratio with respect to the rotational speed of input shaft IN, where the rotation of output shaft OUT is faster than in the second gear ratio.

Figure 8:
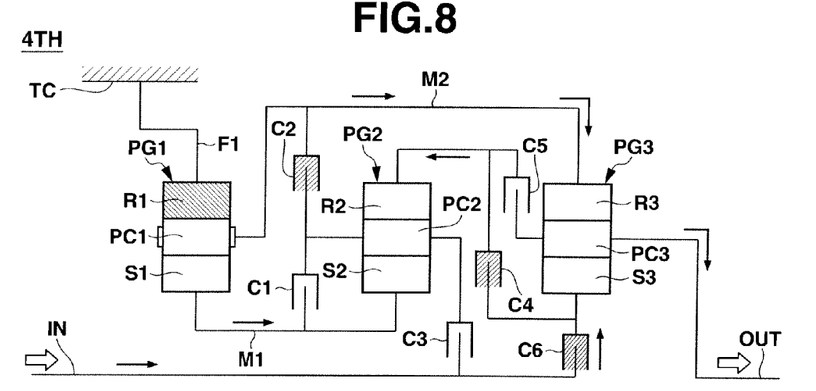
FIG. 8 is a diagram showing how the fourth gear ratio is obtained in the automatic transmission according to the present embodiment.

<Fourth Gear Ratio> In the fourth gear ratio, second clutch C2, fourth clutch C4 and sixth clutch C6 are simultaneously applied, as shown by hatching pattern in FIG. 8. With fourth clutch C4 and sixth clutch C6 simultaneously applied, input shaft IN, second ring gear R2 and third sun gear S3 are coupled to and held stationary with respect to each other so that input shaft IN, second ring gear R2 and third sun gear S3 rotate as a solid unit. With second clutch C2 applied, first planet-pinion carrier PC1, second planet-pinion carrier PC2 and third ring gear R3 are coupled to and held stationary with respect to each other so that first planet-pinion carrier PC1, second planet-pinion carrier PC2 and third ring gear R3 rotate as a solid unit. When input shaft IN is driven in the normal direction, the rotation of input shaft IN causes second ring gear R2 and third sun gear S3 to rotate in the normal direction at the same speed. The rotation of second ring gear R2 causes second sun gear S2 and second planet-pinion carrier PC2 of second planetary gearset PG2 to rotate under a constraint about rotation of first sun gear S1 and first planet-pinion carrier PC1 of first planetary gearset PG1 wherein first ring gear R1 is held stationary, namely, under a condition that the rotational speed of first sun gear S1 is conformed to the rotational speed of second sun gear S2 through first rotor M1, and the rotational speeds of first planet-pinion carrier PC1 and second planet-pinion carrier PC2 are conformed to each other through second clutch C2 and second rotor M2. The rotation of second planet-pinion carrier PC2 determined under this condition drives third ring gear R3 through second clutch C2 and second rotor M2. In this way, third planetary gearset PG3 provides a planetary function of two inputs and one output. Third planet-pinion carrier PC3 is caused to rotate in the normal direction at a speed which is determined by the rotational speed of third sun gear S3 (the input speed) and the rotational speed of third ring gear R3. Finally, the rotation of third planet-pinion carrier PC3 drives output shaft OUT in the normal direction with a speed reduction of the fourth gear ratio with respect to the rotational speed of input shaft IN, where the rotation of output shaft OUT is faster than in the third gear ratio.

Figure 9:
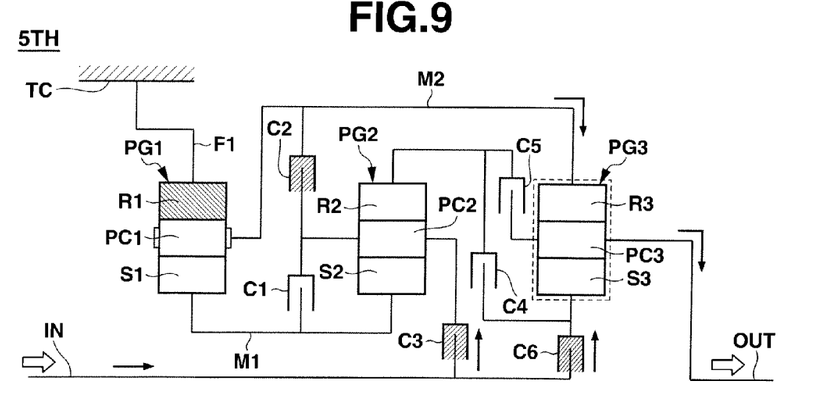
FIG. 9 is a diagram showing how the fifth gear ratio is obtained in the automatic transmission according to the present embodiment.

<Fifth Gear Ratio> In the fifth gear ratio, second clutch C2, third clutch C3 and sixth clutch C6 are simultaneously applied, as shown by hatching pattern in FIG. 9. With second clutch C2, third clutch C3 and sixth clutch C6 simultaneously applied, third sun gear S3 and third ring gear R3 of third planetary gearset PG3 are locked together so that third sun gear S3, third planet-pinion carrier PC3 and third ring gear R3 of third planetary gearset PG3 rotate as a solid unit, and input shaft IN, first planet-pinion carrier PC1 and second planet-pinion carrier PC2 are coupled to and held stationary with respect to third planetary gearset PG3. When input shaft IN is driven, the rotation of input shaft IN causes all of the members of third planetary gearset PG3 rotate as a solid unit at the same speed as input shaft IN. The rotation of third planet-pinion carrier PC3 drives output shaft OUT in the normal direction with no speed reduction with respect to the rotational speed of input shaft IN, where the rotation of output shaft OUT is equal to that of input shaft IN, where the fifth gear ratio is equal to one (direct drive gear ratio).

Figure 10:
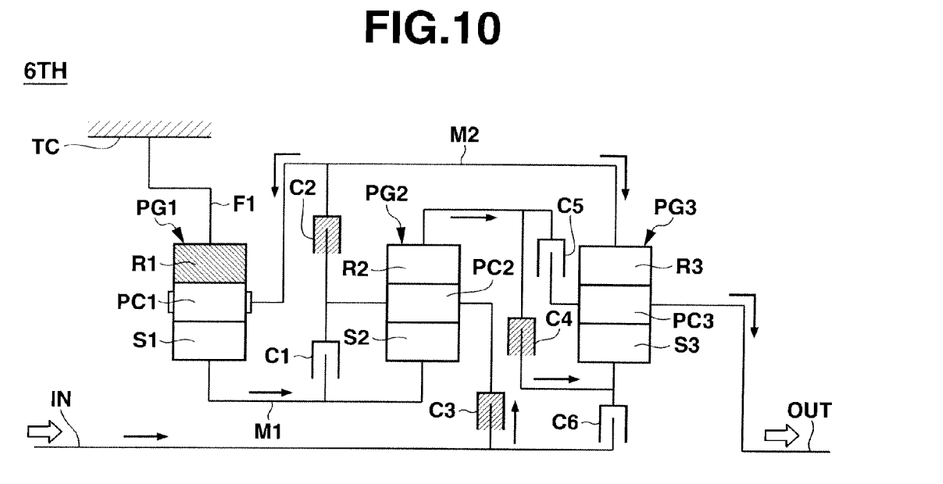
FIG. 10 is a diagram showing how the sixth gear ratio is obtained in the automatic transmission according to the present embodiment.

<Sixth Gear Ratio> In the sixth gear ratio, second clutch C2, third clutch C3 and fourth clutch C4 are simultaneously applied, as shown by hatching pattern in FIG. 10. With second clutch C2 and third clutch C3 applied simultaneously, input shaft IN, first planet-pinion carrier PC1, second planet-pinion carrier PC2 and third ring gear R3 are coupled to and held stationary with respect to each other so that input shaft IN, first planet-pinion carrier PC1, second planet-pinion carrier PC2 and third ring gear R3 rotate as a solid unit. With fourth clutch C4 applied, second ring gear R2 and third sun gear S3 are coupled to and held stationary with respect to each other so that second ring gear R2 and third sun gear S3 rotate as a solid unit. When input shaft IN is driven in the normal direction, the rotation of input shaft IN causes first planet-pinion carrier PC1, second planet-pinion carrier PC2 and third ring gear R3 to rotate in the normal direction at the same speed as input shaft IN. The rotation of first planet-pinion carrier PC1 causes first sun gear S1 to rotate in the reverse direction in first planetary gearset PG1 where first ring gear R1 is held stationary with respect to transmission case TC. The rotation of first sun gear S1 drives second sun gear S2 through first rotor M1. Accordingly, second planetary gearset PG2 provides a planetary function of two inputs and one output. In second planetary gearset PG2, second ring gear R2 is caused to rotate at a speed which is determined by the rotational speed of second planet-pinion carrier PC2 (the input speed) and the rotational speed of second sun gear S2. The rotation of second ring gear R2 drives third sun gear S3 through fourth clutch C4. Accordingly, third planetary gearset PG3 provides a planetary function of two inputs and one output. In third planetary gearset PG3, third planet-pinion carrier PC3 is caused to rotate at a speed which is determined by the rotational speed of third ring gear R3 (the input speed) and the rotational speed of third sun gear S3. Finally, the rotation of third planet-pinion carrier PC3 drives output shaft OUT in the normal direction with a speed increase of the sixth gear ratio with respect to the rotational speed of input shaft IN, where the rotation of output shaft OUT is faster than that of input shaft IN and than in the fifth gear ratio.

Figure 11:
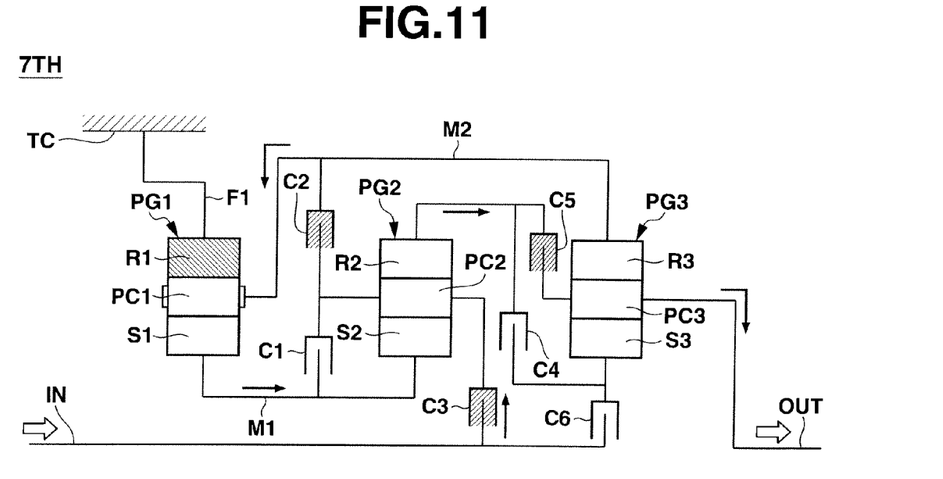
FIG. 11 is a diagram showing how the seventh gear ratio is obtained in the automatic transmission according to the present embodiment.

<Seventh Gear Ratio> In the seventh gear ratio, second clutch C2, third clutch C3 and fifth clutch C5 are simultaneously applied, as shown by hatching pattern in FIG. 11. With second clutch C2 and third clutch C3 applied simultaneously, input shaft IN, first planet-pinion carrier PC1, second planet-pinion carrier PC2 and third ring gear R3 are coupled to and held stationary with respect to each other so that input shaft IN, first planet-pinion carrier PC1, second planet-pinion carrier PC2 and third ring gear R3 rotate as a solid unit. With fifth clutch C5 applied, second ring gear R2 and third planet-pinion carrier PC3 are coupled to and held stationary with respect to each other so that second ring gear R2 and third planet-pinion carrier PC3 rotate as a solid unit. When input shaft IN is driven in the normal direction, the rotation of input shaft IN causes first planet-pinion carrier PC1, second planet-pinion carrier PC2 and third ring gear R3 to rotate in the normal direction at the same speed as input shaft IN. The rotation of first planet-pinion carrier PC1 causes first sun gear S1 to rotate in the reverse direction in first planetary gearset PG1 where first ring gear R1 is held stationary with respect to transmission case TC. The rotation of first sun gear S1 drives second sun gear S2 through first rotor M1. Accordingly, second planetary gearset PG2 provides a planetary function of two inputs and one output. In second planetary gearset PG2, second ring gear R2 is caused to rotate at a speed which is determined by the rotational speed of second planet-pinion carrier PC2 (the input speed) and the rotational speed of second sun gear S2. The rotation of second ring gear R2 drives third planet-pinion carrier PC3 through fifth clutch C5. Finally, the rotation of third planet-pinion carrier PC3 drives output shaft OUT in the normal direction with a speed increase of the seventh gear ratio with respect to the rotational speed of input shaft IN, where the rotation of output shaft OUT is faster than that of input shaft IN and than in the sixth gear ratio.

Figure 12:
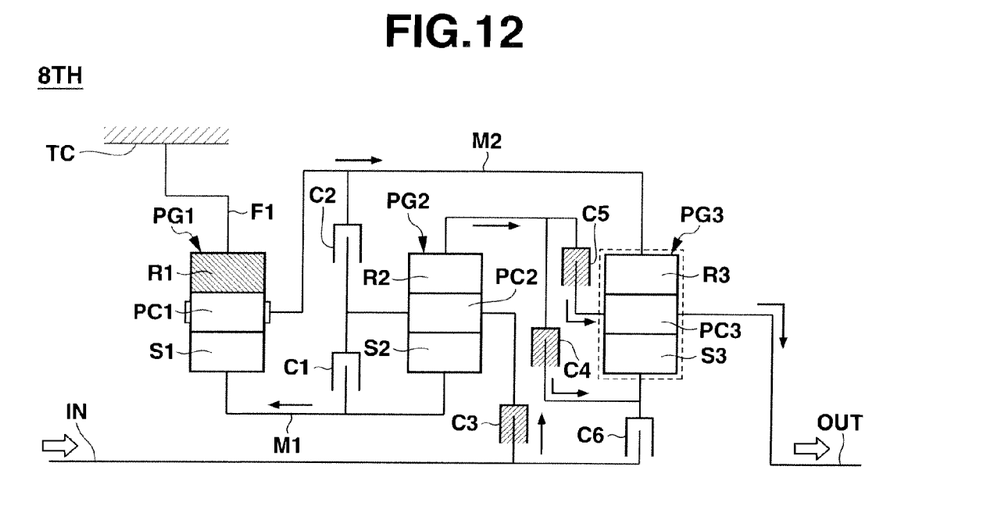
FIG. 12 is a diagram showing how the eighth gear ratio is obtained in the automatic transmission according to the present embodiment.

<Eighth Gear Ratio> In the eighth gear ratio, third clutch C3, fourth clutch C4 and fifth clutch C5 are simultaneously applied, as shown by hatching pattern in FIG. 12. With third clutch C3 applied, input shaft IN and second planet-pinion carrier PC2 are coupled to and held stationary with respect to each other so that input shaft IN and second planet-pinion carrier PC2 rotate as a solid unit. With fourth clutch C4 and fifth clutch C5 simultaneously applied, third sun gear S3 and third planet-pinion carrier PC3 of third planetary gearset PG3 are coupled to and held stationary with respect to each other so that third sun gear S3, third planet-pinion carrier PC3 and third ring gear R3 of third planetary gearset PG3 rotate as a solid unit, and first planet-pinion carrier PC1 and second ring gear R2 are coupled to and held stationary with respect to third planetary gearset PG3 so that first planet-pinion carrier PC1, second ring gear R2 and third planetary gearset PG3 rotate as a solid unit. When input shaft IN is driven in the normal direction, the rotation of input shaft IN causes second planet-pinion carrier PC2 to rotate in the normal direction at the same speed. The rotation of second planet-pinion carrier PC2 causes second sun gear S2 and second ring gear R2 of second planetary gearset PG2 and third planetary gearset PG3 to rotate under a constraint about rotation of first sun gear S1 and first planet-pinion carrier PC1 of first planetary gearset PG1 wherein first ring gear R1 is held stationary, namely, under a condition that the rotational speed of first sun gear S1 is conformed to the rotational speed of second sun gear S2 through first rotor M1, and the rotational speeds of first planet-pinion carrier PC1, second ring gear R2 and third planetary gearset PG3 are conformed to each other through fourth clutch C4, fifth clutch C5 and second rotor M2. Third planet-pinion carrier PC3 is caused to rotate in the normal direction at the rotational speed of third planetary gearset PG3 determined under the above constraint. Finally, the rotation of third planet-pinion carrier PC3 drives output shaft OUT in the normal direction with a speed increase of the eighth gear ratio with respect to the rotational speed of input shaft IN, where the rotation of output shaft OUT is faster than the input speed and than in the seventh gear ratio.

Figure 13:
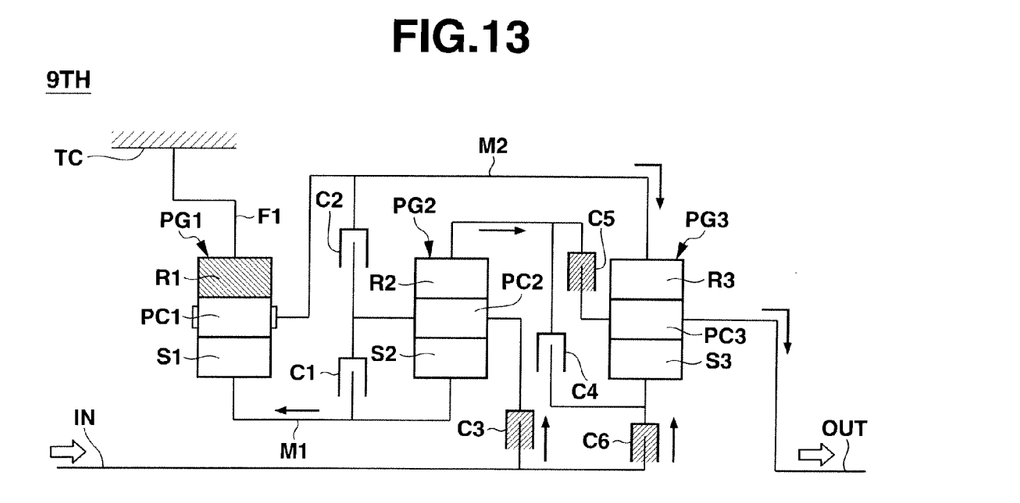
FIG. 13 is a diagram showing how the ninth gear ratio is obtained in the automatic transmission according to the present embodiment.

<Ninth Gear Ratio> In the ninth gear ratio, third clutch C3, fifth clutch C5 and sixth clutch C6 are simultaneously applied, as shown by hatching pattern in FIG. 13. With third clutch C3 and sixth clutch C6 simultaneously applied, input shaft IN, second planet-pinion carrier PC2 and third sun gear S3 are coupled to and held stationary with respect to each other so that input shaft IN, second planet-pinion carrier PC2 and third sun gear S3 rotate as a solid unit. With fifth clutch C5 applied, second ring gear R2 and third planet-pinion carrier PC3 are coupled to and held stationary with respect to each other so that second ring gear R2 and third planet-pinion carrier PC3 rotate as a solid unit. When input shaft IN is driven in the normal direction, the rotation of input shaft IN causes second planet-pinion carrier PC2 and third sun gear S3 to rotate in the normal direction at the same speed. This causes second sun gear S2 of second planetary gearset PG2 and third ring gear R3 of third planetary gearset PG3 to rotate under a constraint about rotation of first sun gear S1 and first planet-pinion carrier PC1 of first planetary gearset PG1 wherein first ring gear R1 is held stationary, namely, under a condition that the rotational speed of first sun gear S1 is conformed to the rotational speed of second sun gear S2 through first rotor M1, and the rotational speed of first planet-pinion carrier PC1 is conformed to the rotational speed of third ring gear R3 through second rotor M2. Third planetary gearset PG3 provides a planetary function of two inputs and one output. In third planetary gearset PG3, third planet-pinion carrier PC3 is caused to rotate in the normal direction at a speed which is determined by the rotational speed of third sun gear S3 (the input speed) and the rotational speed of third ring gear R3 determined under the above constraint. Finally, the rotation of third planet-pinion carrier PC3 drives output shaft OUT in the normal direction with a speed increase of the ninth gear ratio with respect to the rotational speed of input shaft IN, where the rotation of output shaft OUT is faster than the input speed and than in the eighth gear ratio.

Figure 14:
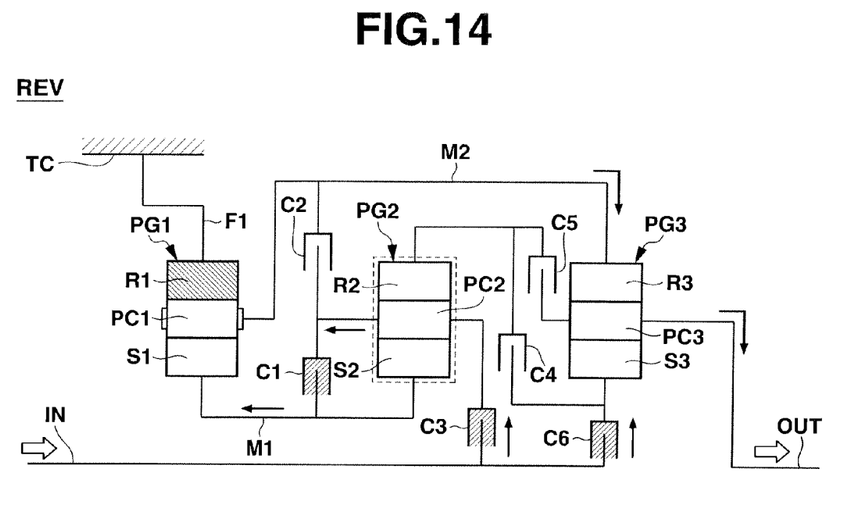
FIG. 14 is a diagram showing how the reverse gear ratio is obtained in the automatic transmission according to the present embodiment.

<Reverse Gear Ratio> In the reverse gear ratio, first clutch C1, third clutch C3 and sixth clutch C6 are simultaneously applied, as shown by hatching pattern in FIG. 14. With first clutch C1, third clutch C3 and sixth clutch C6 simultaneously applied, second sun gear S2 and second planet-pinion carrier PC2 of second planetary gearset PG2 are coupled to and held stationary with respect to each other so that second sun gear S2, second planet-pinion carrier PC2 and second ring gear R2 of second planetary gearset PG2 rotate as a solid unit, and input shaft IN, first sun gear S1, second planetary gearset PG2 and third sun gear S3 are coupled to and held stationary with respect to each other so that input shaft IN, first sun gear S1, second planetary gearset PG2 and third sun gear S3 rotate as a solid unit. When input shaft IN is driven in the normal direction, the rotation of input shaft IN causes first sun gear S1, third sun gear S3, and second sun gear S2, second planet-pinion carrier PC2 and second ring gear R2 to rotate in the normal direction at the same speed. The rotation of first sun gear S1 causes first planet-pinion carrier PC1 rotate in the reverse direction in first planetary gearset PG1 where first ring gear R1 is held stationary. The rotation of first planet-pinion carrier PC1 drives third ring gear R3 through second rotor M2. Third planetary gearset PG3 provides a planetary function of two inputs and one output. In third planetary gearset PG3, third planet-pinion carrier PC3 is caused to rotate in the reverse direction at a speed which is determined by the rotational speed of third sun gear S3 (the input speed) and the rotational speed of third ring gear R3. Finally, the rotation of third planet-pinion carrier PC3 drives output shaft OUT in the reverse direction with a slight speed increase of the reverse gear ratio with respect to the rotational speed of input shaft IN.

Figure 15:
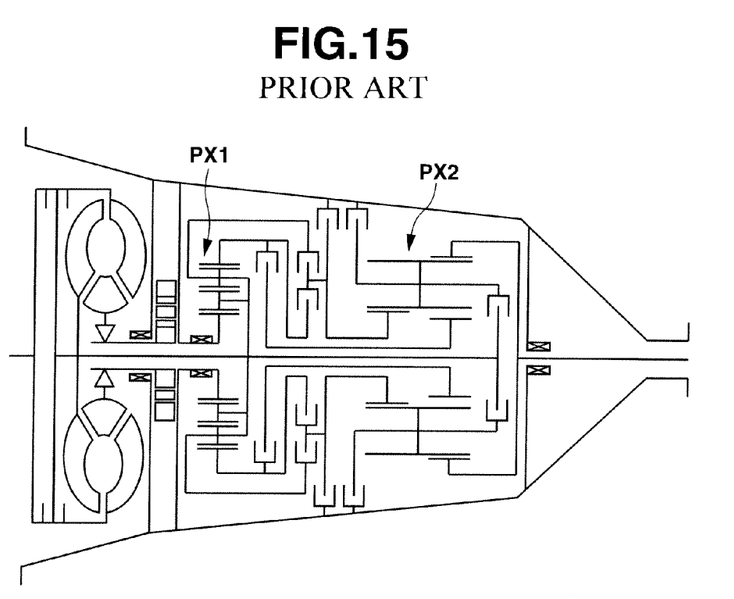
FIG. 15 is a skeleton diagram showing an automatic transmission according to a reference example.
Figure 16:
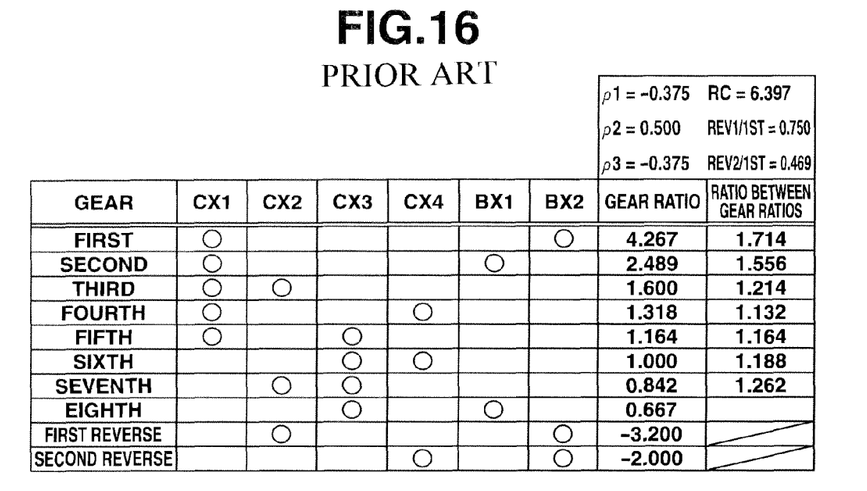
FIG. 16 is a table showing which two of six coupling members are selectively applied to obtain respective ones of eight forward gear ratios and two reverse gear ratios in the automatic transmission shown in FIG. 15.
Figure 17:
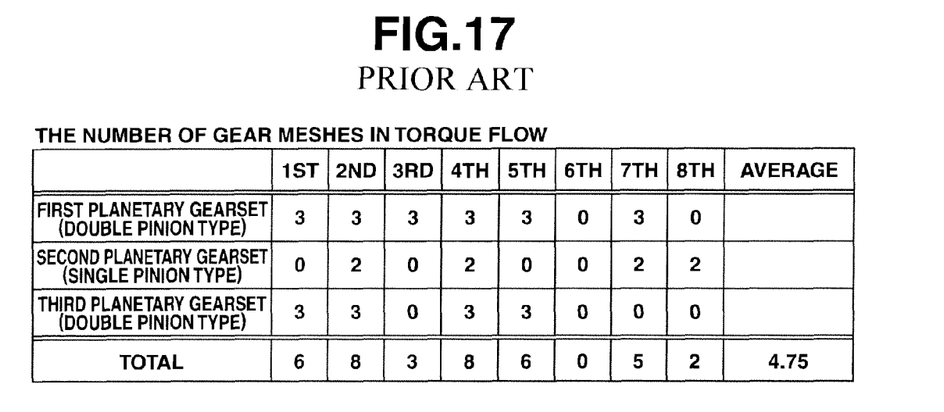
FIG. 17 is a table showing the number of gear meshes in torque flow in each forward gear ratio in the automatic transmission shown in FIG. 15.
Figure 18:
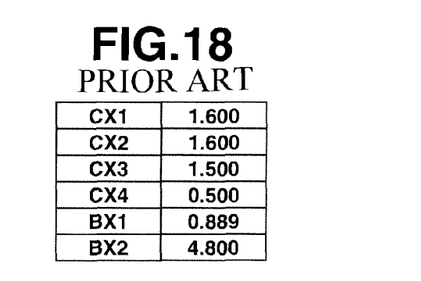
FIG. 18 is a table showing a maximum applied torque ratio of each coupling member in the automatic transmission shown in FIG. 15.

<Advantageous Effects in Comparison with Reference Example> The following describes advantageous effects produced by the automatic transmission according to the present embodiment as compared to a reference example. FIG. 15 shows an automatic transmission according to a reference example as disclosed in Japanese Patent Application Publication No. 2001-182785. FIG. 16 shows which two of six coupling members are selectively applied to obtain respective ones of eight forward gear ratios and two reverse gear ratios in the automatic transmission shown in FIG. 15. FIG. 17 shows the number of gear meshes in torque flow in each forward gear ratio in the automatic transmission shown in FIG. 15. FIG. 18 shows a maximum applied torque ratio of each coupling member in the automatic transmission shown in FIG. 15.

The automatic transmission according to the reference example can be regarded as having three planetary gearsets, as described below. The automatic transmission according to the present embodiment and the automatic transmission according to the reference example have the following three common features: (1) Each transmission includes three planetary gearsets and six coupling members for providing eight forward gear ratios and one reverse gear ratio; (2) In each transmission, every gearshift between two adjacent gears is implemented by a single clutch changeover operation, namely, by a single combination of application of one coupling member and release of another coupling member; and (3) In each transmission, the sun-to-ring gear ratios of the three planetary gearsets $\rho 1$, $\rho 2$ and $\rho 3$ are in a range of 0.30 to 0.65. However, the automatic transmission according to the present embodiment is advantageous at least in the following points as compared to the automatic transmission according to the reference example.

<A. Friction Loss in Each Gear Ratio> In the automatic transmission according to the reference example, each gear ratio is obtained by simultaneous application of two of the six coupling members, as shown in FIG. 16. Accordingly, in this automatic transmission, four of the coupling members are released constantly, in each of which a pair of engaging elements are rotating relative to each other. For example, in the first gear ratio, second clutch CX2, third clutch CX3, fourth clutch CX4, and first brake BX1 are released, in each of which a pair of engaging elements are rotating with respect to each other. Relative rotation between the engaging elements in each released coupling member can cause a friction loss due to oil drag, etc., and thereby adversely affect the power transfer efficiency. If the automatic transmission according to the reference example is applied to an engine vehicle, the friction loss in the four coupling members can cause a decrease in the fuel efficiency of the vehicle. In contrast, in the automatic transmission according to the present embodiment, each gear ratio is obtained by simultaneous application of three of the six coupling members. Accordingly, in the automatic transmission according to the present embodiment, three of the coupling members are released constantly, in each of which a pair of engaging elements are rotating relative to each other. For example, in the first gear ratio, second clutch C2, third clutch C3 and fourth clutch C4 are released, in each of which a pair of engaging elements are rotating with respect to each other. In this way, the automatic transmission according to the present embodiment achieves a reduction in the number of coupling members released, and thereby a reduction in the friction loss, and an increase in the power transfer efficiency. If applied to an engine vehicle, the automatic transmission according to the present embodiment enhances the fuel efficiency of the vehicle.

<B. Number of Forward Gear Ratios> The automatic transmission according to the reference example provides eight forward gear ratios with three planetary gearsets and six coupling members. In contrast, the automatic transmission according to the present embodiment provides nine forward gear ratios with three planetary gearsets and six coupling members. This feature makes it possible to select one from more forward gear ratios with which a suitable driving torque can be produced depending on the operating condition of the vehicle, and thereby enhances the fuel efficiency. This feature further serves to reduce the ratios between two adjacent gear ratios, and thereby suppress gaps in driving torque between two adjacent gear ratios and suppress shift shock during gearshift between two adjacent gear ratios.

<C. Three Planetary Gearsets> The automatic transmission according to the reference example includes a double-pinion planetary gearset PX1, and a Ravigneaux planetary gearset PX2. The Ravigneaux planetary gearset has two sun gears; two sets, one longer than the other, of planet pinions supported in one planet-pinion carrier; and a single ring gear. The Ravigneaux planetary gearset can be regarded as having a double-pinion planetary gearset and a single-pinion planetary gearset. In summary, the automatic transmission according to the reference example is regarded as having two double-pinion planetary gearsets and one single-pinion planetary gearset. This structure can cause at least the following three adverse effects: (1) The diameters of planet pinions are small, adversely affecting the durability and reliability of the planet pinions; and (2) The automatic transmission is composed of a large number of parts, adversely affecting the manufacturing cost.

In contrast, the automatic transmission according to the present embodiment has one double-pinion planetary gearset and two single-pinion planetary gearsets, wherein first planetary gearset PG1 is a double-pinion planetary gearset, and second planetary gearset PG2 and third planetary gearset PG3 are single-pinion planetary gearsets. This feature is advantageous at least in the following three points (i) to (iii) as compared to the reference example.

(i) According to the automatic transmission according to the present embodiment, planet pinion gears has larger diameters and thereby higher durability and reliability. In a single-pinion planetary gearset, a set of planet pinion gears are arranged between a sun gear and a ring gear, where the diameter of each planet pinion gear is set equal to about the spacing between the sun gear and the ring gear. In contrast, in a double-pinion planetary gearset, the diameter of each planet pinion gear must be set smaller than the spacing between the sun gear and the ring gear. In this way, in a single-pinion planetary gearset, the diameter of each planet pinion gear is larger, so that the rigidity of the planet pinion gear and the strength of the tooth flanks of the planet pinion gear can be enhanced, and the durability and reliability can be therefore enhanced, as compared to a double-pinion planetary gearset.

(ii) According to the automatic transmission according to the present embodiment, the smaller number of parts leads to a reduced manufacturing cost. For example, if four planet pinion sets are needed, a double-pinion planetary gearset has four sets of double pinion gears, namely, eight planet pinion gears. In contrast, a single-pinion planetary gearset has four sets of single pinion gears, namely, four planet pinion gears. In this way, the automatic transmission according to the present embodiment achieves a reduction of four in the number of planet pinion gears, for example, and thereby a reduction in the manufacturing cost.

(iii) According to the automatic transmission according to the present embodiment, the number of gear meshes in torque flow is comparable to that of the reference example, wherein the gear efficiency is suppressed from falling and gear noise level is suppressed from increasing. A double-pinion planetary gearset has three places in torque flow where torque is transmitted between gears turning in mesh with each other, whereas a single-pinion planetary gearset has two places in torque flow where torque is transmitted between gears turning in mesh with each other, with no pair of planet pinion gears turning in mesh with each other. Specifically, in the automatic transmission according to the present embodiment, the average number of gear meshes in torque flow is equal to 5.00, as shown in FIG. 3. On the other hand, in the automatic transmission according to the reference example, the average number of gear meshes in torque flow is equal to 4.75, as shown in FIG. 17.

<D. Gear Ratio Range> The gear ratio range of an automatic transmission is represented by an indicator called overall gear ratio coverage which is a ratio of the highest gear ratio (the lowest-speed gear ratio) to the lowest gear ratio (the highest-speed gear ratio). The overall gear ratio coverage RC is desired to be high in general, so as to achieve flexible gear ratio settings. The automatic transmission according to the reference example provides an overall gear ratio coverage RC of 6.397 (=4.267/0.667), when the sun-to-ring gear ratio of double-pinion planetary gearset PX1, $\rho 1$, is equal to −0.375, the sun-to-ring gear ratios of Ravigneaux planetary gearset PX2, $\rho 2$ and $\rho 3$, are equal to 0.500, −0.375, respectively, as shown in FIG. 16. In contrast, the automatic transmission according to the present embodiment provides an overall gear ratio coverage RC of 10.310 (=4.196/0.407), while maintaining preferable intervals between two adjacent gear ratios, when the sun-to-ring gear ratio of first planetary gearset PG1, $\rho 1$, is equal to −0.493, the sun-to-ring gear ratio of second planetary gearset PG2, $\rho 2$, is equal to 0.327, and the sun-to-ring gear ratio of third planetary gearset PG3, $\rho 3$, is equal to 0.617, as shown in FIG. 2. This enhances both of the starting performance in the lowest-speed gear ratio and the fuel efficiency at high speed in the highest-speed gear ratio. Incidentally, it is preferable that when the ratios between two adjacent gear ratios are plotted and connected by lines in a graph, the graph shows a gradual and smooth decrease, and then a flat extension, when followed from the low gear side to the high gear side. The output speed of the automatic transmission is adjusted with a final gear ratio by the final gear which is disposed on the downstream side of the automatic transmission, and then outputted to the driving wheels. Therefore, as the overall gear ratio coverage RC increases, the flexibility of adjustment by the final gear increases. For example, with the final gear ratio adjusted to be high (or low-geared), the automatic transmission can be suitably adapted to a hybrid vehicle with no torque converter. The automatic transmission can be also suitably adapted to gasoline engines and diesel engines in which the range for providing the optimum fuel efficiency is different from the range for providing the maximum torque. In this way, when adapted to a motor vehicle, the automatic transmission can achieve a sufficient driving torque at the time the vehicle is starting from a standstill, and enhance the fuel efficiency by lowering the engine speed at the time the vehicle is traveling at high speed.

<E. Driving Performance in Reverse Gear Ratio> The first gear ratio and the reverse gear ratio of an automatic transmission are determinant factors of the accelerating ability from standstill and the gradeability. For example, if the ratio between the first gear ratio and the reverse gear ratio is apart from 1, the driving torque is changed with a gap during a gearshift between the first gear ratio and the reverse gear ratio. If the reverse gear ratio is smaller than the first gear ratio, the driving torque at the time of backward acceleration from standstill is smaller than that of forward acceleration from standstill so that the backward accelerating ability may be insufficient. In the automatic transmission according to the reference example, the ratio of the first reverse gear ratio to the first gear ratio is equal to 0.750, and the ratio of the second reverse gear ratio to the first gear ratio is equal to 0.469, as shown in FIG. 16. This causes a gap in driving torque during a gearshift between the second reverse gear ratio and the first gear ratio so that the backward accelerating ability may be insufficient, because the ratio of the second reverse gear ratio to the first gear ratio is much smaller than 1. In contrast, the automatic transmission according to the present embodiment, the ratio of the reverse gear ratio to the first gear ratio is equal to 1.089, as shown in FIG. 2. This ratio of the reverse gear ratio to the first gear ratio is closer to 1 than the ratio of the first reverse gear ratio to the first gear ratio in the reference example. This causes little gap in driving torque during a gearshift between the reverse gear ratio and the first gear ratio so that the backward accelerating ability is sufficient. In this way, the automatic transmission according to the present embodiment is advantageous in the accelerating ability from standstill and the gradeability.

<F. Unit Size> In the automatic transmission according to the reference example, the maximum applied torque ratio of second brake BX2 is equal to 4.800 and the largest among the maximum applied torque ratios of the coupling members (clutches CX1, CX2, CX3 and CX4, and brakes BX1 and BX2), as shown in FIG. 18. In contrast, in the automatic transmission according to the present embodiment, the maximum applied torque ratios of first clutch C1 and third clutch C3 are equal to 2.743 and the largest among the maximum applied torque ratios of the coupling members (clutches C1, C2, C3, C4, C5 and C6), as shown in FIG. 4. This feature serves to reduce the number of friction plates of each coupling member, and thereby reduce the manufacturing cost, and reduce the size of each coupling member, and thereby reduce the size of the automatic transmission unit. This reduces the size of transmission case TC, and thereby significantly serves to reduce the size and weight of the automatic transmission unit, and thereby reduce the manufacturing cost.

<G. Coupling Members> An automatic transmission employs clutches and brakes, wherein each clutch engages or disengages two rotating elements with each other rotating element, and each brake holds one rotating element stationary or releases same. In each brake, a driven plate is constantly stationary, because the brake is provided between a rotating element and a stationary element such as a transmission case. As compared to the case of the clutches, oil between the driving and driven plates of the brake tends to remain because only a small centrifugal force is acting on the oil. Accordingly, when the brake is being released so that a driving plate is rotating relative to the stationary driven plate with a clearance, the friction loss due to drag resistance (oil shear resistance) of the brake is generally larger than those of the clutches. Therefore, in view of fuel efficiency, it is preferable to construct an automatic transmission with a small number of brakes. In the automatic transmission according to the reference example, the six coupling members include two brakes. In each and every gear ratio, at least one of the two brakes is being released so that the driving plate and driven plate are rotating relative to each other with a clearance. Especially, in each of the third to seventh gear ratios, each of the two brakes is being released so that the driving plate and driven plate are rotating relative to each other with a clearance. This causes a large friction loss, and adversely affect the fuel efficiency. In contrast, the automatic transmission according to the present embodiment is constructed with six coupling members all of which are clutches. This serves to reduce the friction loss, and thereby improve the fuel efficiency. Moreover, the use of a clutch is advantageous, because it is unnecessary to fix the clutch to a stationary transmission case or the like so that the clutch can be arranged with high flexibility.

<H. Frequency of Shifting> The automatic transmission according to the reference example provides a direct drive gear ratio in sixth gear, while providing underdrive gear ratios in first to fifth gears, as shown in FIG. 16. This can cause a reduction in the intervals between the underdrive gear ratios, which can cause busy shifting, i.e. increase the frequency of shifting, for example, under city driving conditions where frequent stops and restarts are needed. Such busy shifting can make a driver feel uncomfortable, because engine rotation rises quickly in underdrive gears, in general. In contrast, the automatic transmission according to the present embodiment provides a direct drive gear ratio in fifth gear, while providing underdrive gear ratios in first to fourth gears, as shown in FIG. 2. This expands the intervals between the underdrive gear ratios, and suppresses busy shifting, for example, under city driving conditions where frequent stops and restarts are needed, and thereby prevents a driver from feeling uncomfortable.

The following summarizes the features of the automatic transmission according to the present embodiment, and the advantageous effects produced by the features.

<A1> An automatic transmission includes: a double-pinion planetary gearset (first planetary gearset PG1) including: a first sun gear (S1); a first ring gear (R1) constantly held stationary; and a first planet-pinion carrier (PC1) arranged to carry a first planet pinion set (P1) in mesh with the first sun gear (S1) and the first ring gear (R1); a first single-pinion planetary gearset (second planetary gearset PG2) including: a second sun gear (S2), wherein the second sun gear (S2) is constantly coupled to the first sun gear (S1) so as to constitute a first rotor unit (first rotor M1, first sun gear S1, second sun gear S2); a second ring gear (R2); and a second planet-pinion carrier (PC2) arranged to carry a second planet pinion set (P2) in mesh with the second sun gear (S2) and the second ring gear (R2); a second single-pinion planetary gearset (third planetary gearset PG3) including: a third sun gear (S3); a third ring gear (R3), wherein the third ring gear (R3) is constantly coupled to the first planet-pinion carrier (PC1) so as to constitute a second rotor unit (second rotor M2, first planet-pinion carrier PC1, third ring gear R3); and a third planet-pinion carrier (PC3) arranged to carry a third planet pinion set (P3) in mesh with the third sun gear (S3) and the third ring gear (R3); an input shaft (IN); an output shaft (OUT) constantly coupled to the third planet-pinion carrier (PC3); a first coupling member (first clutch C1) arranged to be selectively applied to couple the second planet-pinion carrier (PC2) to the first rotor unit (M1, S1, S2); a second coupling member (second clutch C2) arranged to be selectively applied to couple the second planet-pinion carrier (PC2) to the second rotor unit (M2, PC1, R3); a third coupling member (third clutch C3) arranged to be selectively applied to couple the input shaft (IN) to the second planet-pinion carrier (PC2); a fourth coupling member (fourth clutch C4) arranged to be selectively applied to couple the second ring gear (R2) to the third sun gear (S3); a fifth coupling member (fifth clutch C5) arranged to be selectively applied to couple the second ring gear (R2) to the third planet-pinion carrier (PC3); and a sixth coupling member (sixth clutch C6) arranged to be selectively applied to couple the input shaft (IN) to the third sun gear (S3); wherein at least first to ninth forward gear ratios and one reverse gear ratio are obtained between the input shaft (IN) and the output shaft (OUT) by simultaneous application of three of the first to sixth coupling members (C1, C2, C3, C4, C5, C6). This feature provides at least eight forward gear ratios with three planetary gearsets and six coupling members, while enhancing the power transfer efficiency by suppressing the friction loss in each gear ratio.

<A2> In the automatic transmission: the first forward gear ratio is obtained by simultaneous application of the first, fifth and sixth coupling members (first clutch C1, fifth clutch C5, sixth clutch C6); the second forward gear ratio is obtained by simultaneous application of the first, second and sixth coupling members (first clutch C1, second clutch C2, sixth clutch C6); the third forward gear ratio is obtained by simultaneous application of the second, fifth and sixth coupling members (second clutch C2, fifth clutch C5, sixth clutch C6); the fourth forward gear ratio is obtained by simultaneous application of the second, fourth and sixth coupling members (second clutch C2, fourth clutch C4, sixth clutch C6); the fifth forward gear ratio is obtained by simultaneous application of the second, third and sixth coupling members (second clutch C2, third clutch C3, sixth clutch C6); the sixth forward gear ratio is obtained by simultaneous application of the second, third and fourth coupling members (second clutch C2, third clutch C3, fourth clutch C4); the seventh forward gear ratio is obtained by simultaneous application of the second, third and fifth coupling members (second clutch C2, third clutch C3, fifth clutch C5); the eighth forward gear ratio is obtained by simultaneous application of the third, fourth and fifth coupling members (third clutch C3, fourth clutch C4, fifth clutch C5); and a ninth forward gear ratio is obtained by simultaneous application of the third, fifth and sixth coupling members (third clutch C3, fifth clutch C5, sixth clutch C6). This feature makes it possible to select one from more forward gear ratios with which a suitable driving torque can be produced depending on the operating condition of the vehicle, and thereby enhances the fuel efficiency. This feature further serves to reduce the ratios between two adjacent gear ratios, and thereby suppress gaps in driving torque between two adjacent gear ratios and suppress shift shock during gearshift between two adjacent gear ratios. This feature makes it possible to set a larger overall gear ratio coverage while maintaining preferable intervals between two adjacent gear ratios, thereby enhancing both of the starting performance in the lowest-speed gear ratio and the fuel efficiency at high speed in the highest-speed gear ratio. This feature expands the intervals between the underdrive gear ratios, and suppresses busy shifting, and thereby prevents a driver from feeling uncomfortable. The feature that the automatic transmission is constructed with six coupling members all of which are clutches, serves to reduce the friction loss, and is advantageous for the durability, manufacturing cost, size and layout of the automatic transmission.

<A3> In the automatic transmission, the reverse gear ratio is obtained by simultaneous application of the first, third and sixth coupling members (first clutch C1, third clutch C3, sixth clutch C6). This feature makes it possible to set the ratio of the reverse gear ratio to the first gear ratio (as a quantity for evaluating the reverse gear ratio) close to 1 while achieving a suitable overall gear ratio coverage and maintaining preferable intervals between two adjacent gear ratios. This suppresses the gap in driving torque during the gearshift between the reverse gear ratio and the first gear ratio, and thereby ensures the accelerating ability from standstill and the gradeability.

<Modifications> In the present embodiments, the sun-to-ring gear ratio of first planetary gearset PG1, $\rho 1$, is equal to −0.493, the sun-to-ring gear ratio of second planetary gearset PG2, $\rho 2$, is equal to 0.327, and the sun-to-ring gear ratio of third planetary gearset PG3, $\rho 3$, is equal to 0.617. Each sun-to-ring gear ratio may be changed within a structurally possible range, with which the overall gear ratio coverage RC can be set high and the ratios between gear ratios can be suitably set.

The present automatic transmission may be adapted to front engine front drive vehicles, hybrid vehicles, electric vehicles, fuel cell vehicles, etc., as well as front engine rear drive vehicles to which the present automatic transmission is adapted. The automatic transmission may be adapted to a vehicle provided with a diesel engine as a driving source in which the range of engine speed is generally narrower than gasoline engines, and the output torque is generally smaller than gasoline engines as compared under the assumption that each engine has the same displacement.

The entire contents of Japanese Patent Application 2010-136280 filed Jun. 15, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission comprising:
   a double-pinion planetary gearset including:
      a first sun gear;
      a first ring gear constantly held stationary; and
      a first planet-pinion carrier arranged to carry a first planet pinion set in mesh with the first sun gear and the first ring gear;
   a first single-pinion planetary gearset including:
      a second sun gear, wherein the second sun gear is constantly coupled to the first sun gear so as to constitute a first rotor unit;
      a second ring gear; and
      a second planet-pinion carrier arranged to carry a second planet pinion set in mesh with the second sun gear and the second ring gear;
   a second single-pinion planetary gearset including:
      a third sun gear;
      a third ring gear, wherein the third ring gear is constantly coupled to the first planet-pinion carrier so as to constitute a second rotor unit; and
      a third planet-pinion carrier arranged to carry a third planet pinion set in mesh with the third sun gear and the third ring gear;
   an input shaft;
   an output shaft constantly coupled to the third planet-pinion carrier;
   a first coupling member arranged to be selectively applied to couple the second planet-pinion carrier to the first rotor unit;
   a second coupling member arranged to be selectively applied to couple the second planet-pinion carrier to the second rotor unit;
   a third coupling member arranged to be selectively applied to couple the input shaft to the second planet-pinion carrier;
   a fourth coupling member arranged to be selectively applied to couple the second ring gear to the third sun gear;
   a fifth coupling member arranged to be selectively applied to couple the second ring gear to the third planet-pinion carrier; and
   a sixth coupling member arranged to be selectively applied to couple the input shaft to the third sun gear;
   wherein at least first to eighth forward gear ratios and one reverse gear ratio are obtained between the input shaft and the output shaft by simultaneous application of three of the first to sixth coupling members.

2. The automatic transmission as claimed in claim 1, wherein:
   the first forward gear ratio is obtained by simultaneous application of the first, fifth and sixth coupling members;
   the second forward gear ratio is obtained by simultaneous application of the first, second and sixth coupling members;
   the third forward gear ratio is obtained by simultaneous application of the second, fifth and sixth coupling members;
   the fourth forward gear ratio is obtained by simultaneous application of the second, fourth and sixth coupling members;
   the fifth forward gear ratio is obtained by simultaneous application of the second, third and sixth coupling members;

the sixth forward gear ratio is obtained by simultaneous application of the second, third and fourth coupling members;

the seventh forward gear ratio is obtained by simultaneous application of the second, third and fifth coupling members;

the eighth forward gear ratio is obtained by simultaneous application of the third, fourth and fifth coupling members; and a ninth forward gear ratio is obtained by simultaneous application of the third, fifth and sixth coupling members.

3. The automatic transmission as claimed in claim 1, wherein the reverse gear ratio is obtained by simultaneous application of the first, third and sixth coupling members.

* * * * *